United States Patent
Jeong (10) Patent No.: US 8,284,230 B2
(45) Date of Patent: Oct. 9, 2012

(54) VIDEO COMMUNICATION DEVICE AND CAMERA TRACKING METHOD THEREOF

(75) Inventor: June-Gyu Jeong, Seongnam-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 900 days.

(21) Appl. No.: 12/283,237

(22) Filed: Sep. 10, 2008

(65) Prior Publication Data

US 2009/0096858 A1  Apr. 16, 2009

(30) Foreign Application Priority Data

Oct. 10, 2007  (KR) ........................ 10-2007-0101942

(51) Int. Cl.
*H04N 7/14*  (2006.01)
(52) U.S. Cl. .................................. 348/14.02; 348/14.01
(58) Field of Classification Search ............... 348/14.02, 348/14.01, 14.08, 208.14; 382/103
See application file for complete search history.

(56) References Cited

U.S. PATENT DOCUMENTS

| | | | | |
|---|---|---|---|---|
| 5,412,708 A * | 5/1995 | Katz | ........................ | 348/14.05 |
| 6,275,258 B1 * | 8/2001 | Chim | ...................... | 348/211.12 |
| 7,826,639 B2 * | 11/2010 | Kakuta | ........................ | 382/103 |
| 8,094,193 B2 * | 1/2012 | Peterson et al. | ............... | 348/169 |
| 2004/0174438 A1 * | 9/2004 | Jung | .......................... | 348/222.1 |
| 2005/0265580 A1 * | 12/2005 | Antonucci et al. | ............ | 382/103 |
| 2006/0104487 A1 * | 5/2006 | Porter et al. | ................. | 382/118 |
| 2007/0115349 A1 * | 5/2007 | Currivan et al. | ........... | 348/14.08 |
| 2007/0229652 A1 * | 10/2007 | Center et al. | ............... | 348/14.08 |
| 2010/0194849 A1 * | 8/2010 | Bruno | ........................ | 348/14.16 |

* cited by examiner

*Primary Examiner* — Stella Woo (57) ABSTRACT

A video communication device includes a video communication device body; a camera fitted to the video communication device body to record images of an object; at least one detection unit fitted to the video communication device body to detect the object according to a predetermined condition; and a camera rotation angle adjuster fitted to the video communication device body to adjust a rotation angle of the camera according to detection data from the detection unit so that the camera automatically tracks a position of the object when the object moves. The moving object can be located through a detection unit, such as a voice sensor, a codec, a color sensor and an IR sensor, and be automatically tracked by suitable adjustment of the rotation angle of a camera. A wide angular field is ensured and video telephony quality is improved.

20 Claims, 5 Drawing Sheets

VIDEO COMMUNICATION DEVICE AND CAMERA TRACKING METHOD THEREOF

CROSS-REFERENCE TO RELATED APPLICATION(S) AND CLAIM OF PRIORITY

The present application makes reference to, incorporates the same herein, and claims all benefits accruing under 35 U.S.C. from an application for "VIDEO COMMUNICATION DEVICE AND CAMERA TRACKING METHOD THEREOF" filed in the Korean Intellectual Property Office on Oct. 10, 2007 and there duly assigned Serial No. 2007-0101942.

TECHNICAL FIELD OF THE INVENTION

The present invention relates to a video communication device and a camera tracking method therein, in particular, which can automatically locate a moving object and record images thereof.

BACKGROUND OF THE INVENTION

Due to the continual development of digital camera technology, video communication devices having a digital camera have been widely distributed. A video communication device, operating in a video communication mode, can transmit and receive an image taken by a camera to and from a counterpart device in order to enable video telephony communication.

In general, a user of a video communication device can operate the video communication device held in one hand in a distance within the length of the arm in order to record his/her face using a camera and transmit the image to a counterpart device. Here, the user adjusts the angle of the camera in order to more correctly record his/her face while watching the face image displayed on the screen of the video communication device.

In the prior art, the camera is generally fixed to a body of the video communication device, and thus can record only a limited area. When the user wants to continuously record images of a desired object or a moving object, he/she has to adjust the position of the camera. Accordingly, the images are not properly recorded or displayed, and video telephony quality is poor.

SUMMARY OF THE INVENTION

To address the above-discussed deficiencies of the prior art, it is a primary object to provide a video communication device and a camera tracking method thereof, which can locate a moving object through a detection unit, such as a voice sensor, a coder-decoder (codec), a color sensor and an infrared (IR) sensor, and automatically track the object by suitably adjusting the rotation angle of a camera, so that a wide angular field is ensured, a user can feel as if he/she is talking with a counterpart in person, and video telephony quality is improved.

According to an aspect of the invention, the video communication device includes a video communication device body; a camera fitted to the video communication device body to record images of an object; at least one detection unit fitted to the video communication device body to detect the object according to a predetermined condition; and a camera rotation angle adjuster fitted to the video communication device body to adjust a rotation angle of the camera according to detection data from the detection unit so that the camera automatically tracks a position of the object when the object moves.

The detection unit can be at least one selected from the group consisting of a voice sensor, a codec, a color sensor and an infrared sensor. The voice sensor detects a voice of the object, the codec detects a movement of the object, the luminosity sensor detects the luminosity of the object the color sensor detecting a predetermined color of the object, the infrared sensor detects infrared rays radiated from the object.

According to an aspect of the invention, the camera tracking method in a video communication device includes procedures of: recording images an object by a camera fitted to a video communication device body; detecting the object by at least one detection unit according to a predetermined condition, the detection unit fitted to the video communication device body; and rotating a rotation angle of the camera according to detection data from the detection unit in order to automatically track a position of the object when the object moves.

Here, the voice sensor provided as the detection unit can detect the object located in a place where a relatively louder sound is produced than other places. Alternatively, it is possible to set the voice sensor to detect the object located in a place where a relatively softer sound is produced than other places.

The codec can also be provided as the detection unit to detect the movement of a speaker. The codec can detect the speaker by detecting a previous scene and the present scene and by comparing the difference between the previous and present scenes.

The luminosity sensor can also be provided as the detection unit to detect the speaker who is illuminated by lighting.

Furthermore, the color sensor can be provided as the detection unit to detect the speaker who is wearing clothes of a certain color.

Moreover, the IR sensor can be provided as the detection unit to detect the speaker who is holding an IR pointer.

According to the invention as set forth above, a moving object can be located through a detection unit, such as a voice sensor, a coder-decoder (codec), a color sensor and an infrared (IR) sensor, and be automatically tracked by suitable adjustment of the rotation angle of a camera. Accordingly, a wide angular field is ensured, the user can feel as if he/she is talking with a counterpart in person, and video telephony quality is improved.

Before undertaking the DETAILED DESCRIPTION OF THE INVENTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION OF THE INVENTION

FIGS. 1 through 8, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged video communication device.

Figure 1:
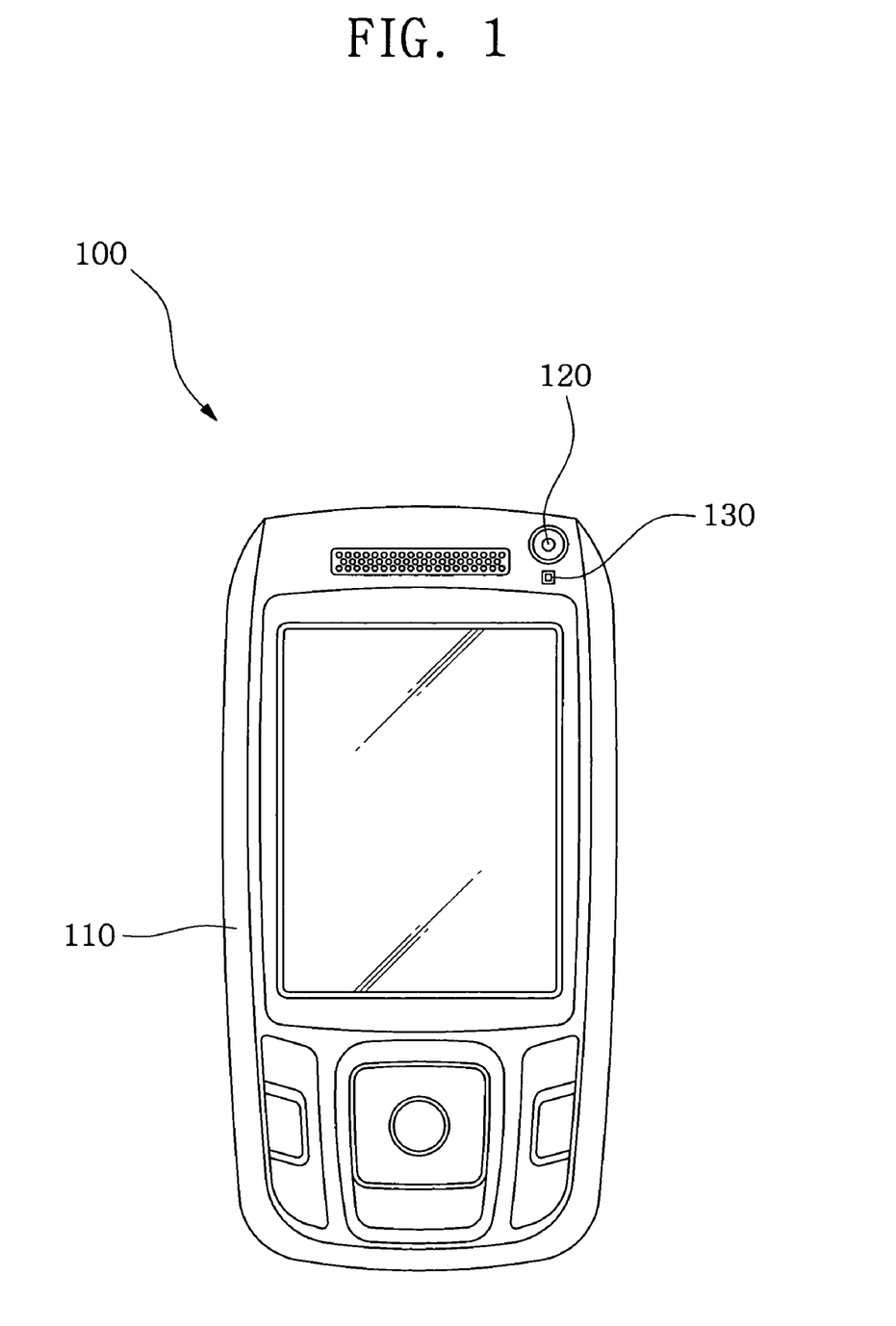
FIG. 1 is a front elevation view of a video communication device of the invention.
Figure 2:
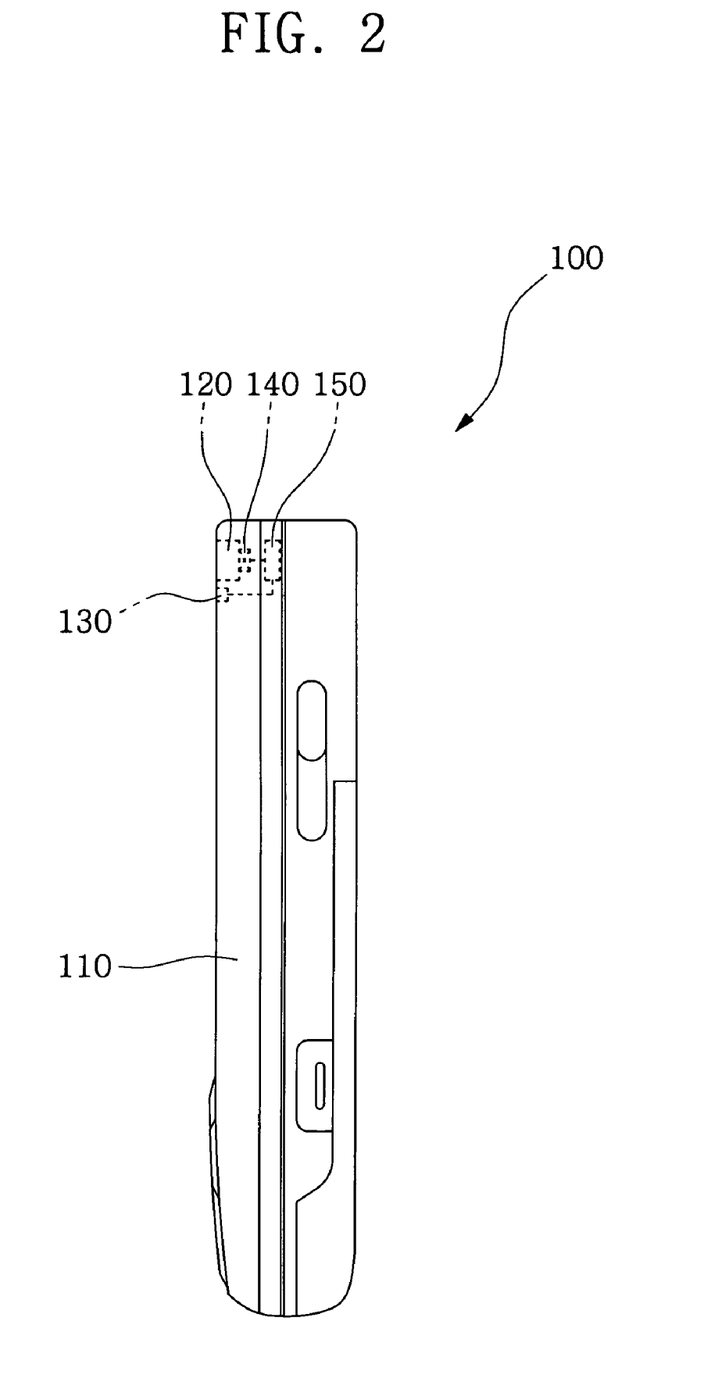
FIG. 2 is a side elevation view of the video communication device of the invention.

FIG. 1 is a front elevation view of a video communication device 100 of the invention, and FIG. 2 is a side elevation view of the video communication device 100 of the invention.

Referring to FIGS. 1 and 2, the video communication device 100 includes a video communication device body 110 and a camera 120, which is disposed in the video communication device body 110 to take pictures of an object (not shown).

The camera 120 is designed to rotate in X or Y axis by a camera rotation angle adjuster 140.

The video communication device 100 also includes at least one detection unit 130, which is disposed in the video communication device body 110, and can detect the object according to predetermined conditions.

The camera rotation angle adjuster 140, disposed in the video communication device body 110, is controlled by the controller 150 to adjust the angle of rotation of the camera 120 in response to the movement of the object, and thereby automatically track the location of the object.

When the image of an object, that is, a speaker is transmitted to a video communication device of the counterpart during a video conference or lecture, the camera rotation angle adjuster 140 enables the camera 120 to continuously record images of the speaker.

The predetermined conditions may be varied according to what type of sensor is used as the detection unit 130, and may be previously programmed in the video communication device 110, so that a user can select any of the conditions in a setting mode of the video communication device 110.

Figure 3:
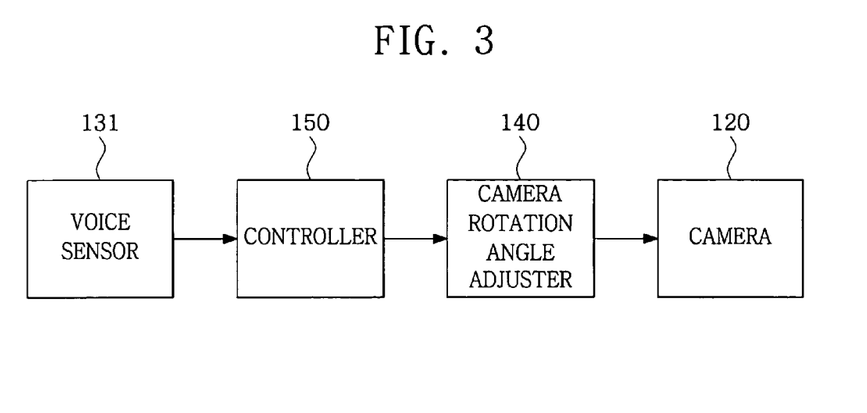
FIG. 3 is a configuration view of the video communication device of the invention, in which a voice sensor is used as the detection unit.

Referring to FIG. 3, a voice sensor 131 is provided as the detection unit to detect a voice of a speaker. The voice sensor 131 detects only the voice of the speaker in a conference room or a lecture room, but neglects noises produced from the same room. Then, the voice sensor 131 sends a detection data to the controller 150, which in turn controls the camera rotation angle adjuster 140 to continuously adjust the rotation angle of the camera 120. Here, the voice sensor 131 can detect the voice of the speaker in the conference room or the lecture room since the voice of the speaker is generally louder than noises.

Figure 4:
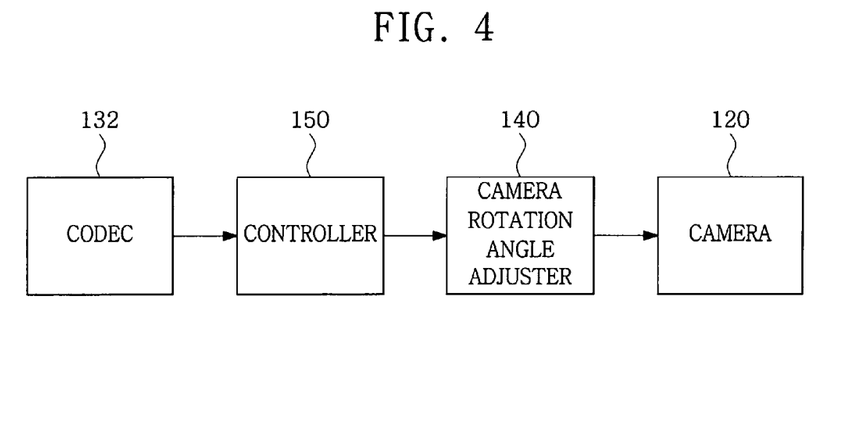
FIG. 4 is a configuration view of the video communication device of the invention, in which a codec is used as the detection unit.

Referring to FIG. 4, a codec 132 is provided as the detection unit to detect a movement of a speaker. The codec 132 detects the speaker who moves more than others in a conference room or a lecture room, and sends the detection data to the controller 150, which in turn controls the camera rotation angle adjuster 140 to continuously adjust the rotation angle of the camera 120. Here, the codec 132 can detect the speaker based on the movement of the speaker in the conference room or the lecture room since the speaker generally moves more than others.

Figure 5:
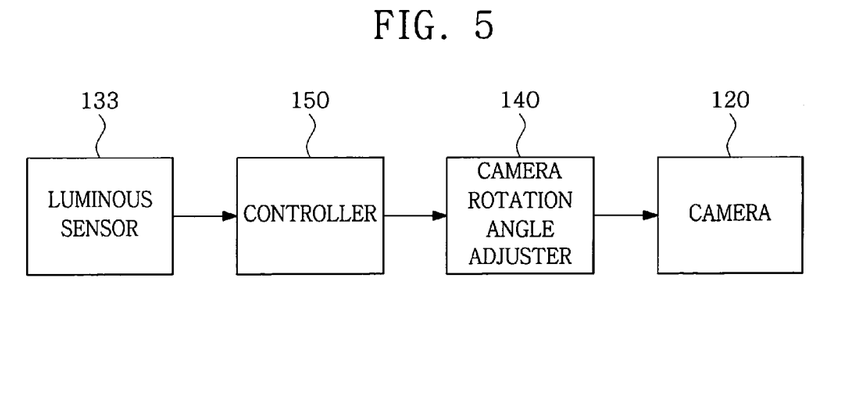
FIG. 5 is a configuration view of the video communication device of the invention, in which a luminosity sensor is used as the detection unit.

Referring to FIG. 5, a luminosity sensor 133 is provided as the detection unit to detect a speaker who is illuminated by lighting. The luminosity sensor 133 detects the speaker who is more illuminated than others in a conference room or a lecture room, and sends the detection data to the controller 150, which in turn controls the camera rotation angle adjuster 140 to continuously adjust the rotation angle of the camera. Here, the luminosity sensor 133 can detect the speaker 133 based on the luminosity of the speaker in the conference room or the lecture room since the speaker is illuminated lighter than others.

Figure 6:
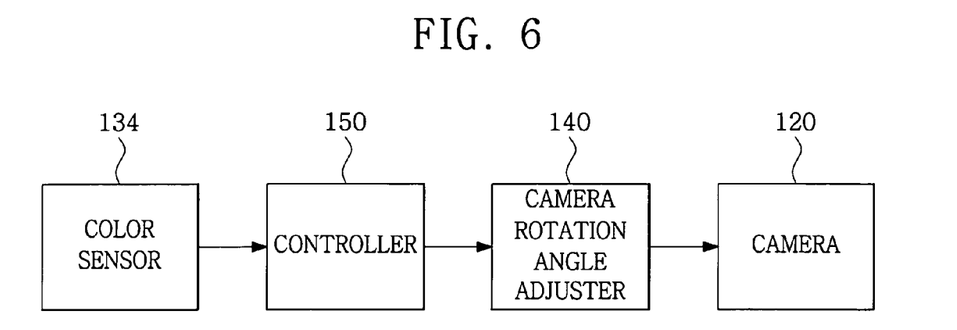
FIG. 6 is a configuration view of the video communication device of the invention, in which a color sensor is used as the detection unit.

Referring to FIG. 6, a color sensor 134 is provided as the detection unit to detect a speaker who is wearing clothes of a certain color. The color sensor 134 detects the speaker who is wearing clothes of the certain color, and sends the detection data to the controller 150, which in turn controls the camera rotation angle adjuster 140 to continuously adjust the rotation angle of the camera 120. This is realized based on the fact that the color sensor 134 can detect a specific color.

Figure 7:
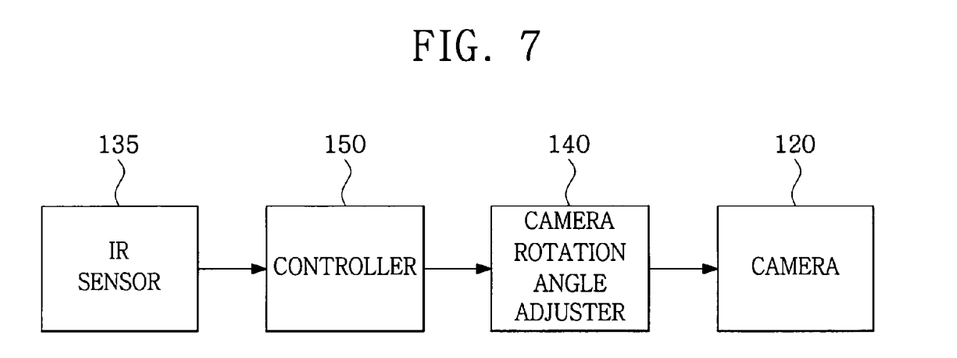
FIG. 7 is a configuration view of the video communication device of the invention, in which an IR sensor is used as the detection unit.

Referring to FIG. 7, an infrared (IR) sensor 135 is provided as the detection unit to detect a speaker who is holding an IR pointer. The IR sensor 135 detects the speaker who is wearing the IR pointer, and sends the detection data to the controller 150, which in turn controls the camera rotation angle adjuster 140 to continuously adjust the rotation angle of the camera 120. This is realized based on the fact that the IR sensor 135 can detect infrared light.

Now, a detailed description will be made of a camera tracking method of the video communication device of the invention.

Figure 8:
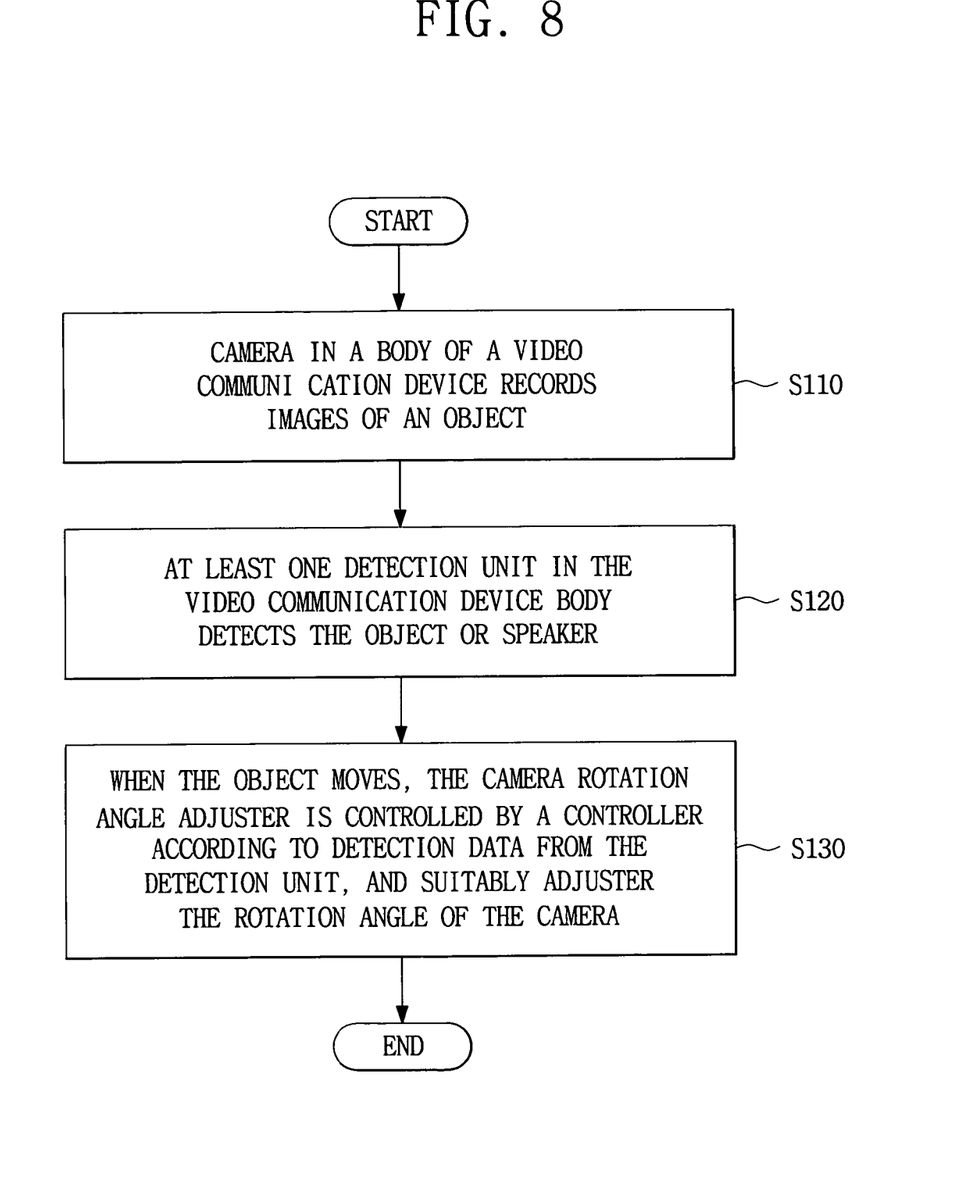
FIG. 8 is a flowchart explaining a camera tracking method of the video communication device of the invention.

FIG. 8 is a flowchart explaining the camera tracking method of the video communication device of the invention.

Referring to FIG. 8, in the first step S110, the camera in the body of the video communication device records images of an object. Here, in a setting mode, a user sets conditions of detecting the object, that is, a speaker before the camera records images of the object.

In the second step S120, at least one detection unit in the video communication device body detects the object or speaker according to predetermined conditions.

Here, a voice sensor can be provided as the detection unit to detect the voice of the speaker. The voice sensor can detect the speaker located in a place where a relatively louder sound is produced than other places.

A codec can also be provided as the detection unit to detect the movement of the speaker. The codec can detect the speaker by detecting a previous scene and the present scene and by comparing the difference between the previous and present scenes.

A luminosity sensor can also be provided as the detection unit to detect the speaker who is illuminated by lighting.

Furthermore, a color sensor can be provided as the detection unit to detect the speaker who is wearing clothes of a certain color.

Moreover, an IR sensor can be provided as the detection unit to detect the speaker who is holding an IR pointer.

Finally, in the third step S130, when the object moves, the camera rotation angle adjust is controlled by the controller according to detection data from the detection unit, and suitably adjusts the rotation angle of the camera, so that the camera can automatically track the position of the object. Images of the object, tracked as above, are transmitted through the video communication device to a counterpart video communication device.

As described above, the camera can record the images of the object, with the rotation angle thereof being adjusted according to the movement of the object, thereby ensuring a wide angular field. Accordingly, the user can feel as if he/she is talking with the counterpart in person, and video telephony quality can be improved.

Although the present disclosure has been described with an exemplary embodiment, various changes and modifications may be suggested to one skilled in the art. It is intended that the present disclosure encompass such changes and modifications as fall within the scope of the appended claims.

What is claimed is:

1. A handheld video communication device comprising:
   a controller configured to receive a selection of predetermined conditions from a user;
   a camera configured to record an image of an object when the object is located in a specified area relative to the camera;
   a plurality of detection units, each detection unit configured to detect the object, when the object is located in the specified area, according to a corresponding predetermined condition selected by the user and to generate detection data based on detecting the object; and
   a camera rotation angle adjuster configured to adjust a rotation angle of the camera according to the detection data from the detection units so that the camera automatically tracks a position of the object when the object moves within the specified area.

2. The video communication device according to claim 1, wherein the detection units comprise a voice sensor configured to detect a voice of the object, and wherein the predetermined condition corresponding to the voice sensor comprises a loudest voice condition.

3. The video communication device according to claim 1, wherein the detection units comprise a coder-decoder (codec) configured to detect a movement of the object, and wherein the predetermined condition corresponding to the codec comprises a most movement condition.

4. The video communication device according to claim 1, wherein the detection units comprise a luminosity sensor configured to detect a luminosity of the object, and wherein the predetermined condition corresponding to the luminosity sensor comprises a most lit condition.

5. The video communication device according to claim 1, wherein the detection units comprise a color sensor configured to detect a predetermined color of the object, wherein the predetermined condition corresponding to the color sensor comprises a clothing color selected by the user.

6. The video communication device according to claim 1, wherein the detection units comprise an infrared sensor configured to detect infrared rays radiated from the object, wherein the predetermined condition corresponding to the infrared sensor comprises an infrared source condition.

7. The video communication device according to claim 1,
   wherein the detection units comprise a voice sensor configured to detect a voice of the object, a codec configured to detect a movement of the object, a luminosity sensor configured to detect a luminosity of the object, a color sensor configured to detect a predetermined color of the object, and an infrared sensor configured to detect infrared rays radiated from the object; and
   wherein the predetermined condition corresponding to the voice sensor comprises a loudest voice condition, the predetermined condition corresponding to the codec comprises a most movement condition, the predetermined condition corresponding to the luminosity sensor comprises a most lit condition, the predetermined condition corresponding to the color sensor comprises a clothing color selected by the user, and the predetermined condition corresponding to the infrared sensor comprises an infrared source condition.

8. A camera tracking method of a handheld video communication device comprising:
   receiving a selection of predetermined conditions from a user;
   recording an image of an object by a camera when the object is located in a specified area relative to the camera;
   when the object is located in the specified area, detecting the object by a plurality of detection units according to, for each of the detection units, a corresponding predetermined condition selected by the user;
   generating with the detection units detection data based on detecting the object; and
   rotating a rotation angle of the camera according to the detection data from the detection units in order to automatically track a position of the object when the object moves within the specified area.

9. The camera tracking method according to claim 8, wherein the detecting of the object comprises detecting the object by at least two selected from the group consisting of a voice sensor, a coder-decoder (codec), a luminosity sensor, a color sensor and an infrared sensor.

10. The camera tracking method according to claim 9, wherein detecting the object by the voice sensor comprises detecting the object in a position where a relatively louder sound is produced.

11. The camera tracking method according to claim 9, wherein detecting the object by the coder-decoder comprises detecting the object by detecting a previous scene and a present scene and by comparing a difference between the previous and present scenes.

12. The camera tracking method according to claim 9, wherein detecting the object by the luminosity sensor comprises detecting a speaker who is illuminated by lighting.

13. The camera tracking method according to claim 9, wherein detecting the object by the color sensor comprises detecting a speaker who is wearing clothes of a color selected by the user.

14. The camera tracking method according to claim 9, wherein detecting the object by the infrared sensor comprises detecting a speaker who is holding an infrared pointer.

15. A camera tracking method of a handheld video communication device comprising:
- receiving a selection of predetermined conditions from a user;
- recording an image of an object by a camera when the object is located in a specified area relative to the camera;
- when the object is located in the specified area, detecting the object by a plurality of detection units according to, for each of the detection units, a corresponding predetermined condition selected by the user;
- generating with the detection unit detection data based on detecting the object;
- detecting a movement of the object based on the detection data from the detection units; and
- automatically rotating a rotation angle of the camera in response to the detected movement of the object, wherein the camera automatically tracks the object when the object moves within the specified area.

16. The method according to claim 15, wherein the detection units comprise a voice sensor configured to detect a voice of the object.

17. The method according to claim 15, wherein the detection units comprise a coder-decoder (codec) configured to detect the movement of the object.

18. The method according to claim 15, wherein the detection units comprise a luminosity sensor configured to detect a luminosity of the object.

19. The method according to claim 15, wherein the detection units comprise a color sensor configured to detect a predetermined color of the object.

20. The method according to claim 15, wherein the detection units comprise an infrared sensor configured to detect infrared rays radiated from the object.

* * * * *

UNITED STATES PATENT AND TRADEMARK OFFICE
CERTIFICATE OF CORRECTION

| | | |
|---|---|---|
| PATENT NO. | : 8,284,230 B2 | Page 1 of 1 |
| APPLICATION NO. | : 12/283237 | |
| DATED | : October 9, 2012 | |
| INVENTOR(S) | : Jeong | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1043 days.

Signed and Sealed this
Twenty-third Day of September, 2014

Michelle K. Lee
*Deputy Director of the United States Patent and Trademark Office*